June 4, 1935.   S. AMANTEA   2,003,987
BELT FASTENER
Filed Oct. 30, 1933
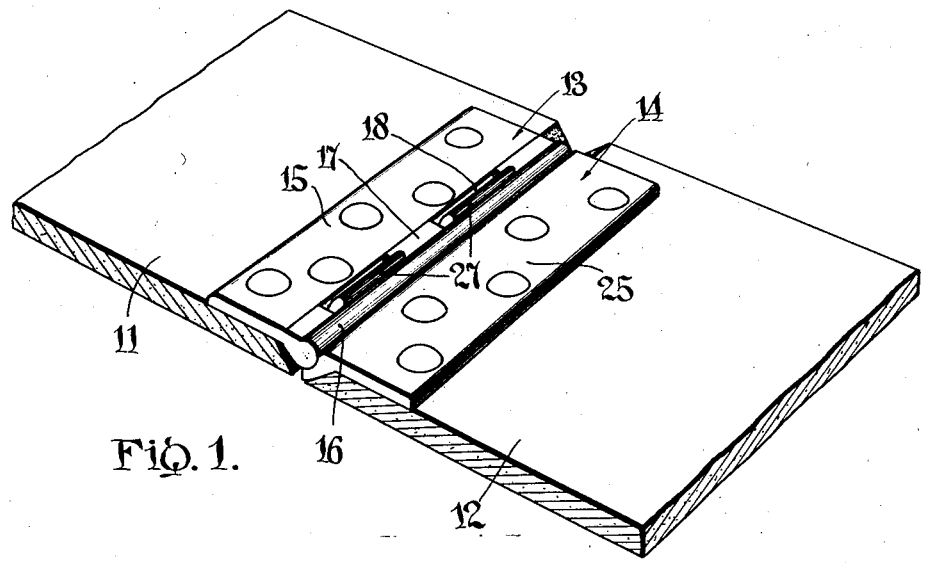
Fig. 1.
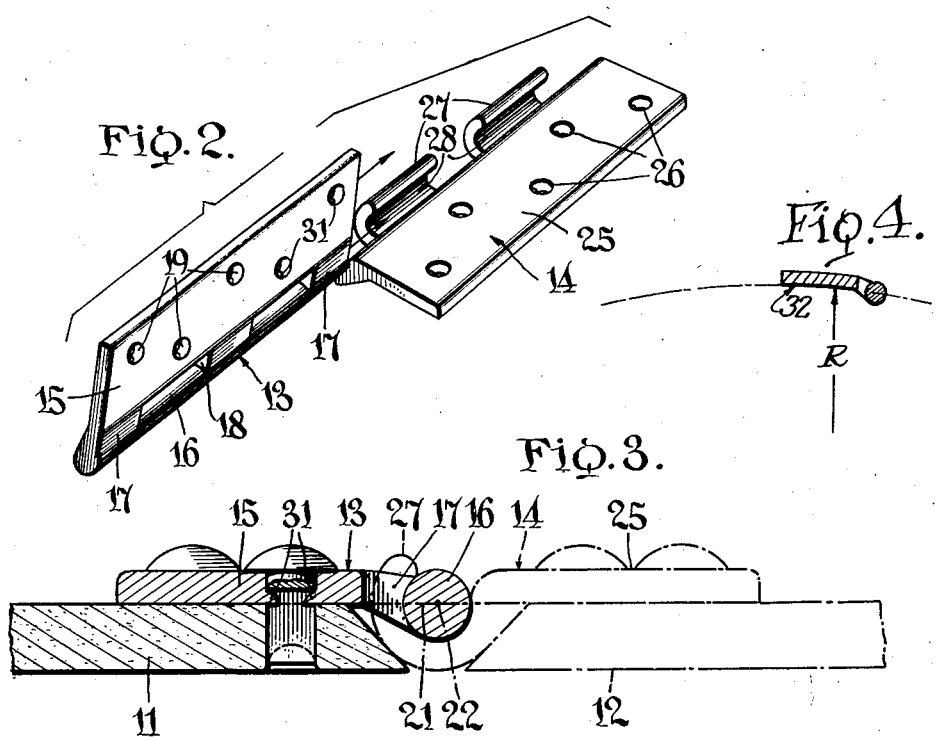
Fig. 2.
Fig. 4.
Fig. 3.
INVENTOR
Samuel Amantea,
BY
Beau & Brooks.
ATTORNEYS Patented June 4, 1935

2,003,987

UNITED STATES PATENT OFFICE 2,003,987

BELT FASTENER

Samuel Amantea, Niagara Falls, N. Y.

Application October 30, 1933, Serial No. 695,929

2 Claims. (Cl. 24—33)

This invention relates to fasteners and particularly to hook type fasteners for use in connection with power transmission belts and the like.

More particularly this invention relates to a type of belt fastener wherein two parts are provided for attachment to the ends of a belt, one part having a hook and the other a bearing for engagement by the hook in such manner as to permit hooking of the two parts together after they are attached to the belting material, and as to permit of relative movement between the parts, when the belt is in use, in order to allow the joined portion of the latter to conform closely to the curvature of pulleys or other driving, driven or guide members.

The invention resides in the formation, arrangement and manner of connection of the component parts including the belting material, as set forth in the following description, which is made in conjunction with the accompanying drawing, wherein:

Fig. 1 is a perspective view of a complete fastener device connecting the ends of a belt, portions of the belt being broken away;

Fig. 2 is a view of the two parts of the fastener brought into position for assembly;

Fig. 3 is a sectional view through one end of the belt and the attached part of the fastener, the other part being indicated in broken lines for clarity of illustration; and Fig. 4 is a showing of the curvature of the belt engaging surface of the fastener.

As illustrated in Fig. 1, the ends 11 and 12 of flexible belting are secured together by a fastener which comprises parts 13 and 14 which preferably are metal castings. Part 13 comprises a substantially flat body portion 15 and a substantially cylindrical bearing portion 16 connected at intervals to the body portion by arm portions 17, such arms providing recesses 18 therebetween. Openings 19 extend through the body portion 15 for receiving rivets or like fasteners by which the part is connected to the belt end 11.

According to my invention the axis of the cylindrical bearing lies in the plane or very slightly below the plane of the bottom surface (the surface which engages the outer, or tensioned, surface of the belt). This relationship is illustrated in Fig. 3 of the drawing wherein line 21 represents an extension of the bottom plane of body portion 15, and, as will be seen, passes through the diametral center 22 of the cylindrical bearing portion 16.

Part 14 comprises a substantially flat body portion 25, similar in size and form to body portion 15, and having openings 26 corresponding to openings 19. Along one edge of body portion 25 are formed a plurality of hooks 27 for seating about the cylindrical portion 16 of part 13 and extending into recesses 18. Each hook is of width substantially equal to the corresponding recess 18 and has its inner surface curved of a radius corresponding to that of cylindrical portion 16. Accordingly the axis of curvature of the inner surfaces of the hooks coincides with the axis 22 of the cylindrical portion 16, and this axis is in, or very slightly below, the plane of the bottom of body portion 25. The mouth 28 of each hook 27 is narrower than the diameter of cylindrical portion 16 and of width slightly greater than the thickness of arm portion 17.

By reason of this formation the parts, when angularly disposed as shown in Fig. 3, may be engaged by moving them (in the direction of the arrows) longitudinally of the axis of cylindrical portion 16 in such manner as to slide the hook portions over the cylindrical portion. When in other angular relationships the parts then will be locked against lateral displacement by the engagement of the end portions of hooks 27 within recesses 18.

In applying my hook fastener, the ends of the belt are beveled, part 13 is secured to the outer surface of the belt at one end and part 14 to the outer surface at the other end. While various kinds of securing means may be used, I prefer to pass rivets 29 through the belting material and apertures 19, the walls of the latter preferably having teats 31 to partially spread the shanks of the rivets. The belt then may be passed around the transmission pulleys, guides, etc., and the parts 13 and 14 connected as hereinbefore described. Or, if the pulleys are mounted upon shaft ends, the parts 13 and 14 may be connected before the belt is put on them.

When in operative relation, the ends 11 and 12 of the belt may be very close together, since the beveled ends provide a recess for the hooks 27. In operation, the outer surface of the belt will ordinarily be under tension, and, by reason of the disposition of the axis of cylindrical portion 16 in the plane of this outer surface, such axis will also be in the plane of tension which overcomes the tendency of the belt to buckle at the fastener, and thereby eliminates wear upon the belt and fastener caused by movement of the parts into aligned relation as the fastener passes onto a pulley.

While herein and in the appended claims I have referred to the body portions 15 and 25 as being substantially flat, it will be understood that such terminology includes formations of the portions with slightly concaved under surfaces, which may be preferred where the belt is intended for use with a pulley of relatively small radius. As shown in Fig. 4 the belt engaging surface 32 of each fastener may be a cylindrical surface having a radius R. It will be understood further that the terms "upper" and "lower" and the like are used herein merely for convenience of description and not as limitations, since the parts may be inverted or disposed at any desired inclination.

I claim:

1. In a belt and fastener therefor, a belt having the ends thereof beveled to define a recess of substantially V-shape on the outer surface of the belt when the ends are brought into adjacency, a part secured to one end of the belt and having a body portion with a substantially flat lower surface seated upon the outer surface of the belt, and a hook portion integral with the body portion, said hook portion being disposed in the recess between the belt ends and having the mouth thereof opening upwardly, another part secured to the other end of the belt and having a body portion with a substantially flat lower surface seated upon the outer surface of the belt, and said other part having an integral cylindrical portion engaged by said hook portion with the longitudinal axis substantially coincident with the axis of curvature of the inner surface of the hook, and arm portions connecting the cylindrical portion to the body portion of said other part, said arm portions extending from the body portion in downwardly inclining relationship and the axis of the cylindrical portions being at least as low as the plane of the outer surface of the belt.

2. In a belt and fastener therefor, a belt so formed that the ends thereof define a recess when said ends are brought into operating relation, a part secured to one end of the belt and having a body portion with a substantially flat lower surface seated upon the outer surface of the belt, and a hook portion integral with the body portion, said hook portion being disposed in the recess between the belt ends and having the mouth thereof opening upwardly, another part secured to the other end of the belt and having a body portion with a substantially flat lower surface seated upon the outer surface of the belt, and said other part having an integral cylindrical portion engaged by said hook portion with the longitudinal axis substantially coincident with the axis of curvature of the inner surface of the hook, and arm portions connecting the cylindrical portion to the body portion of said other part, said arm portions extending from the body portion in downwardly inclining relationship and the axis of the cylindrical portions being at least as low as the plane of the outer surface of the belt.

SAMUEL AMANTEA